US009583095B2

(12) United States Patent
Hanazawa et al.

(10) Patent No.: US 9,583,095 B2
(45) Date of Patent: Feb. 28, 2017

(54) SPEECH PROCESSING DEVICE, METHOD, AND STORAGE MEDIUM

(75) Inventors: Ken Hanazawa, Tokyo (JP); Seiya Osada, Tokyo (JP); Takayuki Arakawa, Tokyo (JP); Koji Okabe, Tokyo (JP); Daisuke Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1020 days.

(21) Appl. No.: 13/383,527

(22) PCT Filed: Jun. 4, 2010

(86) PCT No.: PCT/JP2010/059515
§ 371 (c)(1),
(2), (4) Date: Jan. 11, 2012

(87) PCT Pub. No.: WO2011/007627
PCT Pub. Date: Jan. 20, 2011

(65) Prior Publication Data
US 2012/0116765 A1    May 10, 2012

(30) Foreign Application Priority Data

Jul. 17, 2009   (JP) ................................ 2009-168764

(51) Int. Cl.
*G10L 15/08*    (2006.01)
*G10L 15/04*    (2013.01)

(52) U.S. Cl.
CPC .............. *G10L 15/04* (2013.01); *G10L 15/08* (2013.01)

(58) Field of Classification Search
CPC ........... G06F 17/30684; G06F 17/2775; G06F 17/2809; G10L 13/10; G10L 15/26
USPC ....................... 704/9, 10, 251, 233, 243, 257
See application file for complete search history.

(56) References Cited

U.S. PATENT DOCUMENTS

| | | | |
|---|---|---|---|
| 6,537,325 B1* | 3/2003 | Nishizawa | 715/267 |
| 8,818,793 B1* | 8/2014 | Bangalore et al. | 704/9 |
| 2001/0056344 A1* | 12/2001 | Ramaswamy | G10L 15/22 704/235 |
| 2003/0149558 A1* | 8/2003 | Holsapfel et al. | 704/4 |
| 2005/0108001 A1* | 5/2005 | Aarskog | 704/10 |

(Continued)

FOREIGN PATENT DOCUMENTS

| | | |
|---|---|---|
| JP | 04-117560 A | 4/1992 |
| JP | 06-095684 A | 4/1994 |

(Continued)

OTHER PUBLICATIONS

F. Gallwitz et al., "Integrated recognition of words and prosodic phrase boundaries", Elsevier Science B.V., 2002, pp. 81-95.*
Office Action dated Aug. 27, 2013, issued by the Japanese Patent Office in counterpart Japanese Application No. 2011-522761.

(Continued)

*Primary Examiner* — Mark Villena
(74) *Attorney, Agent, or Firm* — Sughrue Mion, PLLC

(57) ABSTRACT

A speech recognition unit (102) includes a phrase determination unit (103) which determines a phrase boundary based on the comparison between the hypothetical word group generated by speech recognition and set words representing phrase boundaries. In this speech processing device, the speech recognition unit (102) outputs recognition results for each phrase based on a phrase boundary determined by the phrase determination unit (103).

8 Claims, 6 Drawing Sheets

(56) References Cited

U.S. PATENT DOCUMENTS

| | | | |
|---|---|---|---|
| 2006/0015317 A1* | 1/2006 | Nakagawa | G06F 17/2755 704/1 |
| 2006/0161430 A1* | 7/2006 | Schweng | 704/233 |
| 2007/0192309 A1* | 8/2007 | Fischer et al. | 707/5 |
| 2008/0243507 A1* | 10/2008 | Gopinath et al. | 704/257 |
| 2008/0256108 A1* | 10/2008 | Heinze et al. | 707/102 |
| 2009/0063150 A1* | 3/2009 | Nasukawa | G10L 15/26 704/253 |
| 2009/0119103 A1* | 5/2009 | Gerl et al. | 704/243 |
| 2009/0265166 A1* | 10/2009 | Abe | G10L 15/04 704/201 |
| 2012/0116765 A1* | 5/2012 | Hanazawa et al. | 704/251 |

FOREIGN PATENT DOCUMENTS

| | | |
|---|---|---|
| JP | 07-200591 A | 8/1995 |
| JP | 07-261782 A | 10/1995 |
| JP | 08-123469 A | 5/1996 |
| JP | 10-011439 A | 1/1998 |
| JP | 11-259474 A | 9/1999 |
| JP | 3009642 B2 | 2/2000 |
| JP | 2000-112941 A | 4/2000 |
| JP | 2004-012615 A | 1/2004 |
| JP | 3766111 B2 | 4/2006 |
| JP | 3834169 B2 | 10/2006 |
| JP | 2008-269122 A | 11/2008 |

* cited by examiner

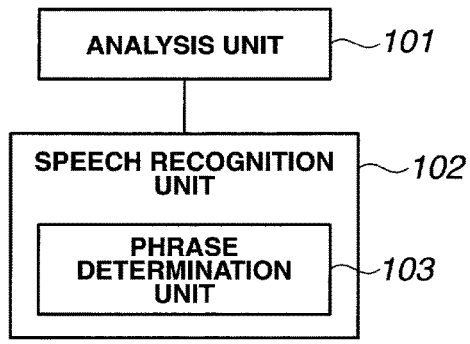
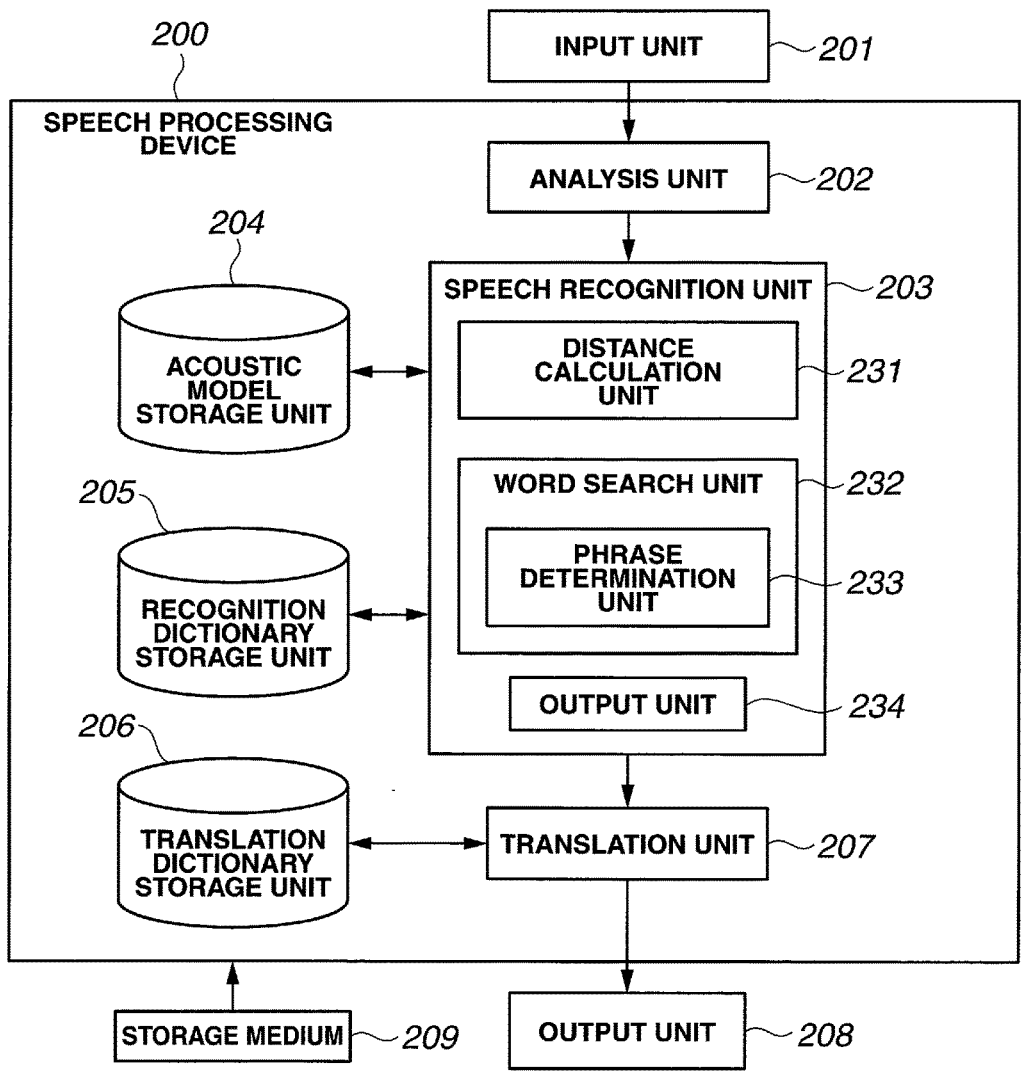

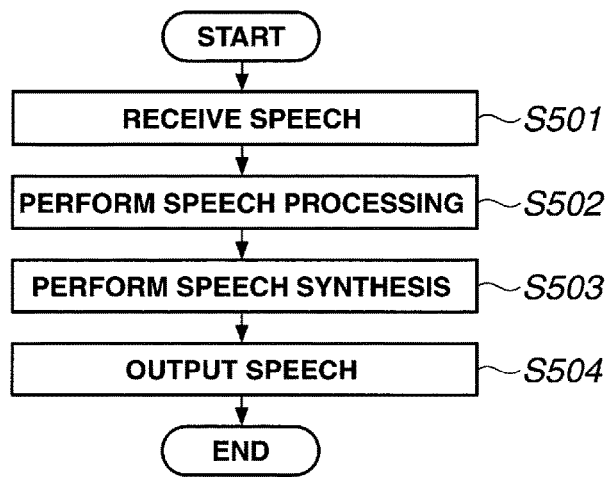
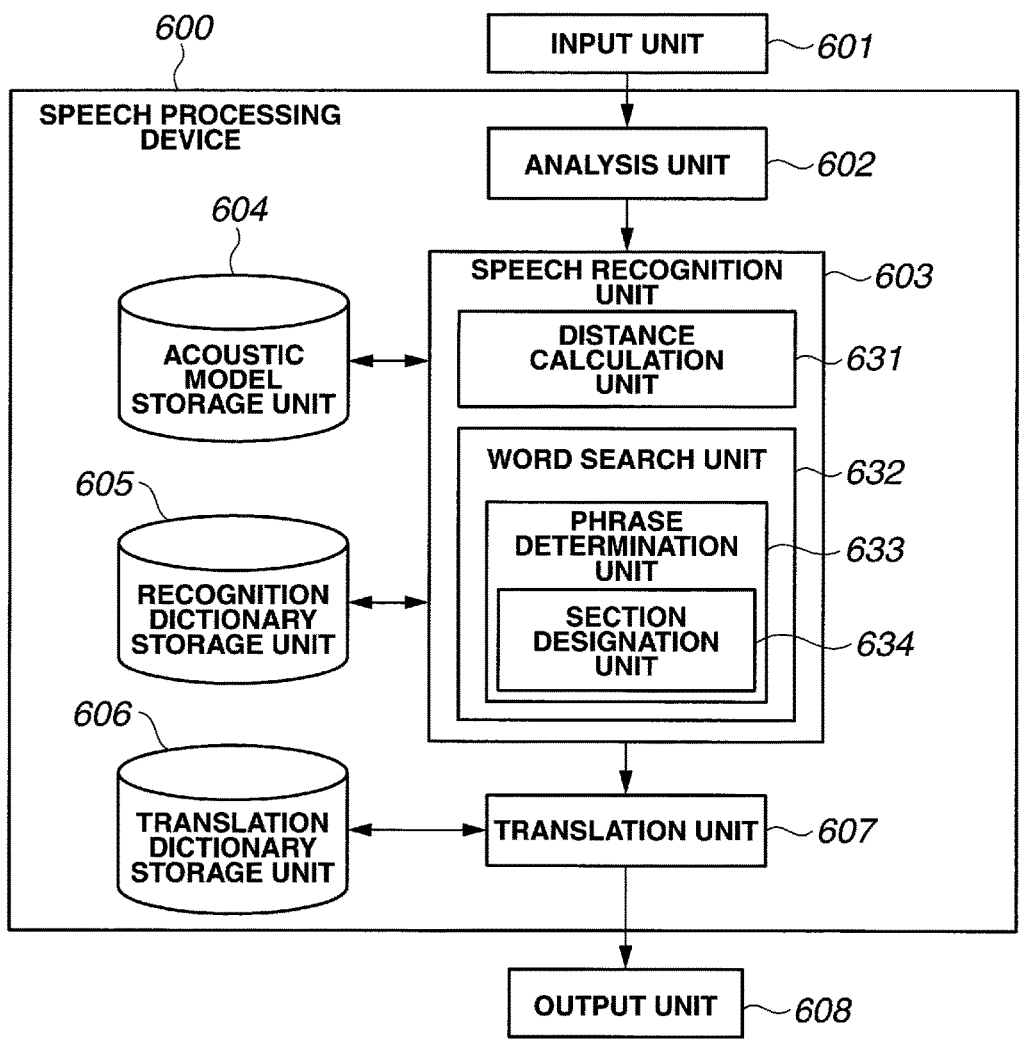

SPEECH PROCESSING DEVICE, METHOD, AND STORAGE MEDIUM

CROSS REFERENCE TO RELATED APPLICATIONS

This application is a National Stage of International Application No. PCT/JP2010/059515 filed Jun. 4, 2010, claiming priority based on Japanese Patent Application No. 2009-168764 filed Jul. 17, 2009 the contents of all of which are incorporated herein by reference in their entirety.

TECHNICAL FIELD

The present invention relates to a speech processing device which recognizes input speech, a speech processing method, and a storage medium.

BACKGROUND ART

There is known a technique of performing automatic speech interpretation (speech translation) by performing speech recognition of an utterance input by speech and translating the recognition result. In this speech translation, importance is placed on a technique of outputting a translation result more instantly. If, for example, it is possible to designate (set) the start and end points of input speech, i.e., an utterance, by designation from the system side or an instruction from the user, it is allowed to perform translation processing in a designated unit. Shortening this unit allows to obtain a translation result more instantly. In contrast to this, when performing speech translation for sequentially and continuously input speech, for example, performing speech communication over telephones, it is impossible to designate the start and end points of an utterance in accordance with an instruction from the user or the like. In such a case, speech translation is simply performed with a wait for a temporary interruption of speech communication. This, however, leads to too long waiting times. At present, there have not been much developments and proposals for techniques and methods of sequentially performing speech translation in this case.

In order to solve this problem, there has been proposed a method of performing speech recognition using a multipass search system by performing the first recognition pass at predetermined time intervals, confirming and outputting stable sections in predetermined time intervals in the second recognition pass, and sequentially outputting speech recognition results (see patent literature 1). There has also been developed a method of estimating the timing of driving the second recognition pass in accordance with frame reliability to cut waste in speech recognition due to always performing the second recognition pass at predetermined time intervals (see patent literature 2).

The above technique is, however, a speech recognition technique, and there has been no mention about how to combine translation processes as discrete processes for the contents of utterances after speech recognition. Furthermore, the recognition results obtained by the above technique do not always correspond to units suitable for translation.

There is also available a method of coping with continuous inputs by giving start and end points to sentences based on syntax restrictions by performing syntax analysis after speech recognition (see patent literature 3). This method, however, increases the processing amount by additionally performing syntax analysis after speech recognition, and leads to a deterioration in the real time performance of recognition result outputs.

There is also available a method of learning periods, in speech recognition, by using a language model, empirical rules, and pause lengths, estimating sentence boundaries of recognition results by inserting the learnt periods in the recognition results, and outputting the recognition results as units suitable for translation processing (see patent literature 4). This method, however, gives no consideration to real time performance for sequentially outputting recognition results or performing translation processing of continuous inputs.

RELATED ART LITERATURE

Patent Literature

Patent Literature 1: Japanese Patent No. 3834169
Patent Literature 2: Japanese Patent Laid-Open No. 2004-12615
Patent Literature 3: Japanese Patent No. 3766111
Patent Literature 4: Japanese Patent No. 3009642
Patent Literature 5: Japanese Patent Laid-Open No. 2008-269122

DISCLOSURE OF INVENTION

Problem to be Solved by the Invention

As described above, according to the related art, it is impossible to sequentially and instantly output speech translation results with high accuracy in a shortened waiting time for continuously input speech. For example, the techniques disclosed in patent literatures 1 and 2 are designed to sequentially output speech recognition results but give no consideration to subsequent translation processing. That is, sequentially output recognition results do not always correspond to units suitable for translation. In addition, the techniques disclosed in patent literatures 3 and 4 allow to designate sentence boundaries suitable for translation from speech recognition results but give no consideration to real time performance for continuous inputs. That is, outputs are not always obtained sequentially, and hence the waiting time for the user may increase.

The invention has been made to solve the above problems, and has as its exemplary object to sequentially output speech translation results with high accuracy while improving the real time performance and shortening the waiting time for continuously input speech.

Means of Solution to the Problem

A speech processing device according to the present invention comprises analysis means for outputting a feature amount by performing speech detection/analysis of input speech, and speech recognition means for outputting a recognition result by performing speech recognition based on the feature amount, wherein the speech recognition means comprises phrase determination means for determining a phrase boundary based on comparison between a hypothetical word group generated by the speech recognition and a set word representing phrase boundary, and outputs the recognition result for each phrase based on a phrase boundary determined by the phrase determination means.

A speech processing method according to the present invention comprises the analysis step of outputting a feature amount by performing speech detection/analysis of input speech, and the speech recognition step of outputting a recognition result by performing speech recognition based on the feature amount, wherein the speech recognition step comprises the phrase determination step of determining a phrase boundary based on comparison between a hypothetical word group generated by the speech recognition and a set word representing phrase boundary, the recognition result being output for each phrase based on a phrase boundary determined in the phrase determination step.

A computer-readable storage medium stores a program for causing a computer to implement an analysis function of outputting a feature amount by performing speech detection/analysis of input speech, and a speech recognition function of outputting a recognition result by performing speech recognition based on the feature amount, wherein the speech recognition function comprises a phrase determination function of determining a phrase boundary based on comparison between a hypothetical word group generated by the speech recognition and a set word representing phrase boundary, and the speech recognition function outputs the recognition result for each phrase based on a phrase boundary determined by the phrase determination function.

Effects of the Invention

As described above, according to the invention, since phrase boundaries are determined based on the comparison between a hypothetical word group generated by speech recognition and set words representing phrase boundaries, it is possible to sequentially output speech translation results with high accuracy while improving the real time performance and shortening the waiting time for continuously input speech.

BRIEF DESCRIPTION OF DRAWINGS

FIG. 1 is a block diagram showing the arrangement of a speech processing device according to the first exemplary embodiment of the present invention;

FIG. 2 is a block diagram showing the arrangement of a speech processing device according to the second exemplary embodiment of the present invention;

FIG. 5 is a flowchart for explaining an example of the operation of the system according to the third exemplary embodiment of the present invention;

FIG. 6 is a block diagram showing the arrangement of a speech processing device according to the fourth exemplary embodiment of the present invention;

BEST MODE FOR CARRYING OUT THE INVENTION

Figure 3:
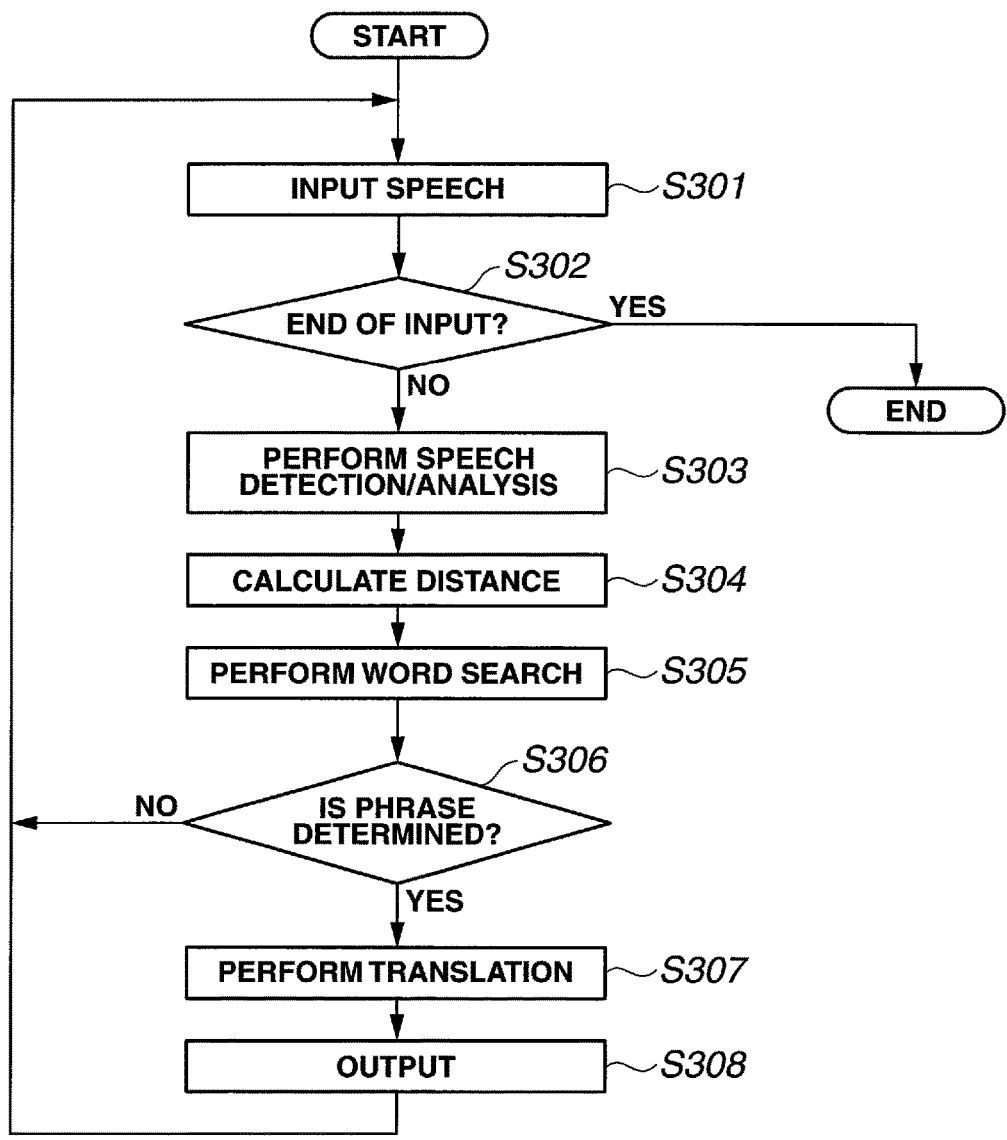
FIG. 3 is a flowchart for explaining an example of the operation of the speech processing device according to the second exemplary embodiment of the present invention.

The exemplary embodiments of the present invention will be described below with reference to the accompanying drawings.

First Exemplary Embodiment

The first exemplary embodiment of the present invention will be described first. FIG. 1 is a block diagram showing the arrangement of a speech processing device according to the first exemplary embodiment. This speech processing device includes an analysis unit 101 which performs speech detection/analysis of input speech and outputs a feature amount, and a speech recognition unit 102 which performs speech recognition based on the feature amount and outputs a recognition result. In addition, the speech recognition unit 102 includes a phrase determination unit 103 which determines phrase boundaries based on the comparison between a hypothetical word group generated by speech recognition and set words representing phrase boundaries. This speech processing device causes the speech recognition unit 102 to output a recognition result for each phrase based on each phrase boundary determined by the phrase determination unit 103.

The operation of the speech processing device according to this exemplary embodiment will be described. First of all, the analysis unit 101 performs speech detection/analysis of input speech and outputs a feature amount. The phase determination unit 103 of the speech recognition unit 102 then determines phrase boundaries based on the comparison between the hypothetical word group generated by speech recognition and set words representing phrase boundaries. The speech recognition unit 102 outputs a recognition result for each phrase based on the determined phrase boundaries.

With this operation, this exemplary embodiment performs speech translation while determining phrase boundaries for translation. In other words, the exemplary embodiment performs translation processing upon extracting a recognition result word string for each unit suitable for translation. This allows the exemplary embodiment to sequentially obtain speech translation results. Phrase boundary determination is performed for the hypothetical word group generated by speech recognition, and hence is performed in the process of word search in speech recognition processing. That is, since this exemplary embodiment does not perform phrase boundary determination after recognition processing, there is little chance that the sequential/real-time performance of recognition result outputs will deteriorate. In addition, giving consideration to the likelihoods and occupation ratios of hypotheses in the process of word search allows to suppress a deterioration in speech recognition accuracy due to sequential recognition result output operation.

Second Exemplary Embodiment

The second exemplary embodiment of the present invention will be described next. FIG. 2 is a block diagram showing the arrangement of a speech processing device 200 according to the second exemplary embodiment. The speech processing device 200 includes an analysis unit 202, a speech recognition unit 203, an acoustic model storage unit 204, a recognition dictionary storage unit 205, a translation dictionary storage unit 206, and a translation unit 207.

The analysis unit 202 detects a speech section from the speech data input by an input unit 201, acoustically analyzes the detected section, and outputs, for example, a cepstrum time sequence which is a feature amount sequence. Techniques of performing speech detection and acoustic analysis are well known techniques, and hence a detailed description of them will be omitted.

The speech recognition unit 203 incorporates a distance calculation unit 231, a word search unit 232, and an output unit 234. The word search unit 232 includes a phrase determination unit 233. The speech recognition unit 203 inputs a feature amount sequence as an output from the analysis unit 202 by using an acoustic model providing acoustic likelihoods and a recognition dictionary constituted by words to be recognized. The output unit 234 then outputs a recognition result word string. The acoustic model storage unit 204 stores the acoustic model. The recognition dictionary storage unit 205 stores the recognition dictionary.

More specifically, first of all, the distance calculation unit 231 performs acoustic calculation of the feature amount sequence obtained by the analysis unit 202 by using an acoustic model. The word search unit 232 performs word search corresponding to the distance calculation result obtained by the distance calculation unit 231 by using a recognition direction, and outputs a word sequence as a recognition result.

The translation unit 207 receives the word string output from the speech recognition unit 203, performs translation by using the translation dictionary stored in the translation dictionary storage unit 206, and outputs the translation result. In this case, the translation dictionary may include grammar knowledge for translation.

The speech processing device 200 described above is a general-purpose computer system and includes a CPU (Central Processing Unit), a RAM (Random Access Memory), a ROM (Read Only Memory), and a nonvolatile storage device as components (not shown). Note that the speech processing device 200 is a computer constituted by, for example, a CPU and the like, reads the OS (Operation System) and speech processing program stored in a storage medium 209 such as a RAM, a ROM, or a nonvolatile storage device, and executes speech processing by executing them. This makes it possible to sequentially output speech translation results of continuous input speech. Note that the speech processing device 200 may be constituted by one computer or a plurality of computers. These apply to the remaining exemplary embodiments.

In addition, the acoustic model storage unit 204, the recognition dictionary storage unit 205, and the translation dictionary storage unit 206 may be formed from a fixed disk, a magnetooptical disk, a nonvolatile storage device such as a flash memory, and a volatile storage device such as a DRAM (Dynamic Random Access Memory). Furthermore, the acoustic model storage unit 204, the recognition dictionary storage unit 205, and the translation dictionary storage unit 206 may be storage devices externally connected to the computer forming the speech processing device 200.

An example of the operation of the speech processing device 200 will be described next with reference to the flowchart shown in FIG. 3. First of all, in step S301, the input unit 201 inputs speech. For example, the input unit 201 is a microphone. For example, an English speech waveform input from the microphone is obtained. In step S302, the device determines the end of the speech input. If, for example, there is input speech, the device continues the subsequent processing. If the input operation has come to an end, the device terminates the processing.

In step S303, the analysis unit 202 detects a speech section from the input speech, performs acoustic analysis of the detected section, and outputs a feature amount sequence. In step S304, the distance calculation unit 231 of the speech recognition unit 203 calculates the distance between the feature amount sequence obtained by the analysis unit 202 and the acoustic model stored in the acoustic model storage unit 204. In this case, the distance calculation unit 231 calculates the closeness between the input speech and the acoustic model. For example, the distance calculation unit 231 calculates the acoustic distance between the feature amount sequence obtained by the analysis unit 202 and the acoustic model, and outputs the distance calculation result. Since a technique of calculating the distance from the acoustic model is a well known technique, a detailed description of it will be omitted.

In step S305, the word search unit 232 of the speech recognition unit 203 generates a hypothetical word (word hypothesis) by searching for the most likelihood word string by using the recognition dictionary stored in the recognition dictionary storage unit 205 based on the distance calculation result obtained by the distance calculation unit 231. If, for example, the input speech is English speech, the device performs English speech recognition to generate a word hypothesis formed from a likelihood English word or word string. A word search technique in speech recognition is a well known technique, and hence a detailed description of it will be omitted.

In step S306, the phrase determination unit 233 of the word search unit 232 determines a phrase boundary based on the comparison between the obtained word hypothesis and set words representing phrase boundaries. In the case of English words, by using the characteristic that the first word of a preposition phrase suitable as a translation unit is a preposition, words whose parts of speech are prepositions are set in advance as words representing phrase boundaries.

Letting Hp be the number of words representing phrase boundaries set in this manner in a word hypothesis, a phrase boundary is determined if the ratio (hypothesis occupation ratio) of Hp to a total number Hall of words of the word hypothesis exceeds a preset threshold Hthre, that is, "Hp/Hall>Hthre" hold.

In phrase boundary determination, the phrase determination unit 233 determines, as a phrase boundary, the start point time of a word, of the word hypotheses representing the phrase boundaries, which exhibits the highest likelihood, and outputs the most likelihood hypothesis in which the time immediately preceding the determined start point time is the end point time of the preceding phrase as a recognition result up to the end point time. Alternatively, the phrase determination unit 233 can determine, as a phrase boundary, one of word hypotheses representing phrase boundaries, which exhibits the highest likelihood, and output the most likelihood hypothesis, in which the determined end point time is the end of a word, as a recognition result up to the determined end point time. The output unit 234 outputs the result.

If the hypothesis occupation ratio is equal to or less than the threshold ("N" in step S306), the process returns to step S301 to accept the next speech input.

According to the above description, words whose parts of speech are prepositions are determined as words representing phrase boundaries. However, the present invention is not limited to this, and other parts of speech, e.g., conjunctions, may be set, including punctuations and pauses. In the case of Japanese language, including fillers such as "ehto" and "anoh" as such words can produce good effects. It is also possible to use combinations of a plurality words instead of single words as long as it is possible to provide processing units suitable for translation. Alternatively, such words can be learnt as a model representing phrase boundaries. A method of learning a model representing phrase boundaries is described in patent literature 5.

When calculating the hypothesis count Hp or Hall in phrase determination, it is possible to calculate a hypothesis count within the same time period during which speech input is performed or to calculate a hypothesis count within a time width including a time immediately before or after a given time.

When phrase determination is performed in the above manner, the translation unit 207 outputs a translation result for a recognition result word string up to a determined phrase boundary by using the translation dictionary stored in the translation dictionary storage unit 206 in step S307. If, for example, the input language is English and the output language is Japanese, an English word string obtained as a recognition result word string is translated from English to Japanese, and a Japanese word string is output as a translation result. A technique of translating word strings is a well known technique, and hence a detailed description of the technique will be omitted.

In step S308, an output unit 208 outputs the above translation result in a state which allows the user to visually recognize the result. When the translation result is output, the process returns to step S301. Steps S301 to S308 are continued until the speech input stops.

According to the above description, the phrase determination unit 233 uses a hypothesis occupation ratio as a determination criterion. However, the present invention is not limited to this. For example, if a word hypothesis representing a phrase boundary exhibits the highest likelihood (first hypothesis) among overall hypotheses, and the likelihood difference between it and a word hypothesis exhibiting the next highest likelihood (second hypothesis) exceeds a threshold, the start point time or end point time of the word representing phrase boundary may be determined as a phrase boundary.

As described above, the speech processing device 200 in this exemplary embodiment performs speech translation while determining phrase boundaries of continuously input speech. That is, this device outputs a recognition result word string and performs translation processing for each unit suitable for translation, and hence can sequentially output speech translation results.

Since this device performs phrase boundary determination in the process of word search in speech recognition processing instead of performing it after recognition processing, there is little chance that the sequential/real-time performance of recognition result outputs will deteriorate. In addition, giving consideration to the likelihoods and occupation ratios of hypotheses in the process of word search allows to suppress a deterioration in speech recognition accuracy due to sequential recognition result output operation.

Third Exemplary Embodiment

Figure 4:
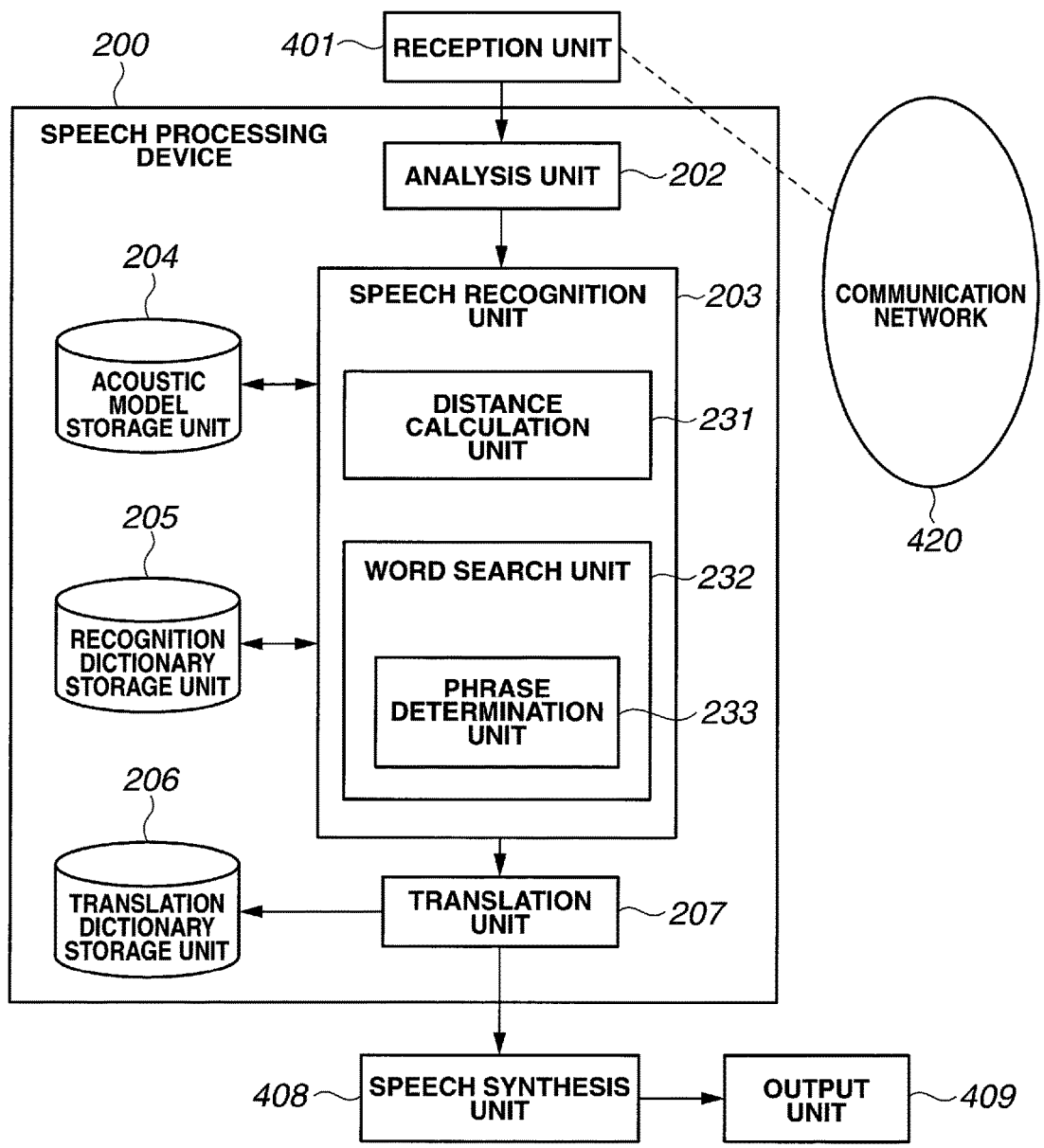
FIG. 4 is a block diagram showing the arrangement of a speech translation system according to the third exemplary embodiment of the present invention using the speech processing device of the second exemplary embodiment.

The third exemplary embodiment of the present invention will be described next. FIG. 4 is a block diagram showing the arrangement of a speech communication translation system according to the third exemplary embodiment using a speech processing device 200. This system includes a reception unit 401, a speech synthesis unit 408, an output unit 409, and a communication network 420, in addition to the speech processing device 200 according to the second exemplary embodiment described above. The communication network 420 is, for example, a public switched telephone network. Note that the communication network 420 may be the Internet communication network.

The reception unit 401 receives the speech input from the communication network 420, and outputs it to the speech processing device 200. The reception unit 401 is, for example, the reception unit of a telephone which implements speech communication.

In the speech processing device 200, an analysis unit 202 performs speech detection/analysis of the speech input received by the reception unit 401. The translation unit 207 sequentially outputs translation results to the speech synthesis unit 408. If, for example, the input language is English and the output language is Japanese, the input speech is translated from English to Japanese, and a Japanese word string is output as a translation result.

The speech synthesis unit 408 performs speech synthesis of sequentially obtained translation results and outputs synthetic speech. More specifically, if, for example, a Japanese word string is obtained as a translation result, the speech synthesis unit 408 performs Japanese speech synthesis. A technique of performing speech synthesis of text data to obtain speech data is a well known technique, and hence a detailed description of it will be omitted. The output unit 409 is, for example, a speaker, which receives the speech data obtained by the speech synthesis unit 408 and outputs speech.

The operation of the system according to the third exemplary embodiment will be described next with reference to the flowchart of FIG. 5. First of all, in step S501, the reception unit 401 receives the speech waveforms continuously input from the communication network 420. In step S502, the analysis unit 202, a speech recognition unit 203, and a translation unit 207 in the speech processing device 200 perform the speech processing described in the second exemplary embodiment, thereby sequentially outputting translation results.

In step S503, the speech synthesis unit 408 performs speech synthesis of the translation results obtained by the speech processing device 200 (S202). For example, the speech synthesis unit 408 performs speech synthesis of Japanese word strings output as translation results. In step S504, the output unit 409 outputs the synthesized speech from, for example, a speaker.

As described above, according to the third exemplary embodiment, the speech data continuously received/input from the communication network 420 are sequentially subjected to speech processing. This makes it possible to sequentially output speech translation results (synthetic speech output). According to the above description, speech translation results are output as synthetic speech. However, the present invention is not limited to this, and the speech translation results may be output as text information.

The above system is, for example, a general-purpose computer system and includes a CPU, a RAM, a ROM, and a nonvolatile storage device as components (not shown). The CPU reads the OS and speech communication translation program stored in the RAM, ROM, or nonvolatile storage device, and executes speech communication translation processing by executing them. This makes it possible to translate speech during speech communication and sequentially output the translation results. Note that the above system need not be constituted by one computer and may be constituted by a plurality of computers.

Fourth Exemplary Embodiment

The fourth exemplary embodiment of the present invention will be described next. FIG. 6 is a block diagram showing the arrangement of a speech processing device 600 according to the fourth exemplary embodiment of the present invention. The speech processing device 600 includes an analysis unit 602, a speech recognition unit 603, an acoustic model storage unit 604, a recognition dictionary storage unit 605, a translation dictionary storage unit 606, and a translation unit 607.

The analysis unit 602 detects a speech section from the speech data input by an input unit 601, performs acoustic analysis of the detected section, and outputs a cepstrum time sequence which is a feature amount sequence. A technique of performing speech detection and acoustic analysis is a well known technique, and hence a detailed description of it will be omitted.

The speech recognition unit 603 incorporates a distance calculation unit 631 and a word search unit 632. The word search unit 632 includes a phrase determination unit 633. These arrangements are the same as those in the second exemplary embodiment described above. In addition, in this exemplary embodiment, the phrase determination unit 633 includes a section designation unit 634. The section designation unit 634 temporarily changes the threshold to be used by the phrase determination unit 633 for phrase determination within a set section for each set section, e.g., a section unit of 500 ms (millisecond) of input speech, based on section information from the start of input operation, e.g., time information. For example, the section designation unit 634 reduces the threshold used by the phrase determination unit 633 within this section at intervals of 500 ms of input speech, thereby setting a state in which phrase boundary determination is facilitated.

Note that in this exemplary embodiment as well, the speech processing device 600 is a general-purpose computer system and includes a CPU, a RAM, a ROM (Read Only Memory), and a nonvolatile storage device as components (not shown). In the speech processing device 600, the CPU reads the OS and speech processing program stored in the RAM, ROM, or nonvolatile storage device, and executes speech processing by executing them. This makes it possible to sequentially output speech translation results of continuous input speech. Note that the speech processing device 600 need not be constituted by one computer and may be constituted by a plurality of computers.

In addition, the acoustic model storage unit 604, the recognition dictionary storage unit 605, and the translation dictionary storage unit 606 may be formed from a fixed disk, a magnetooptical disk, a nonvolatile storage device such as a flash memory, and a volatile storage device such as a DRAM. Furthermore, the acoustic model storage unit 604, the recognition dictionary storage unit 605, and the translation dictionary storage unit 606 may be storage devices externally connected to the computer forming the speech processing device 600.

Figure 7:
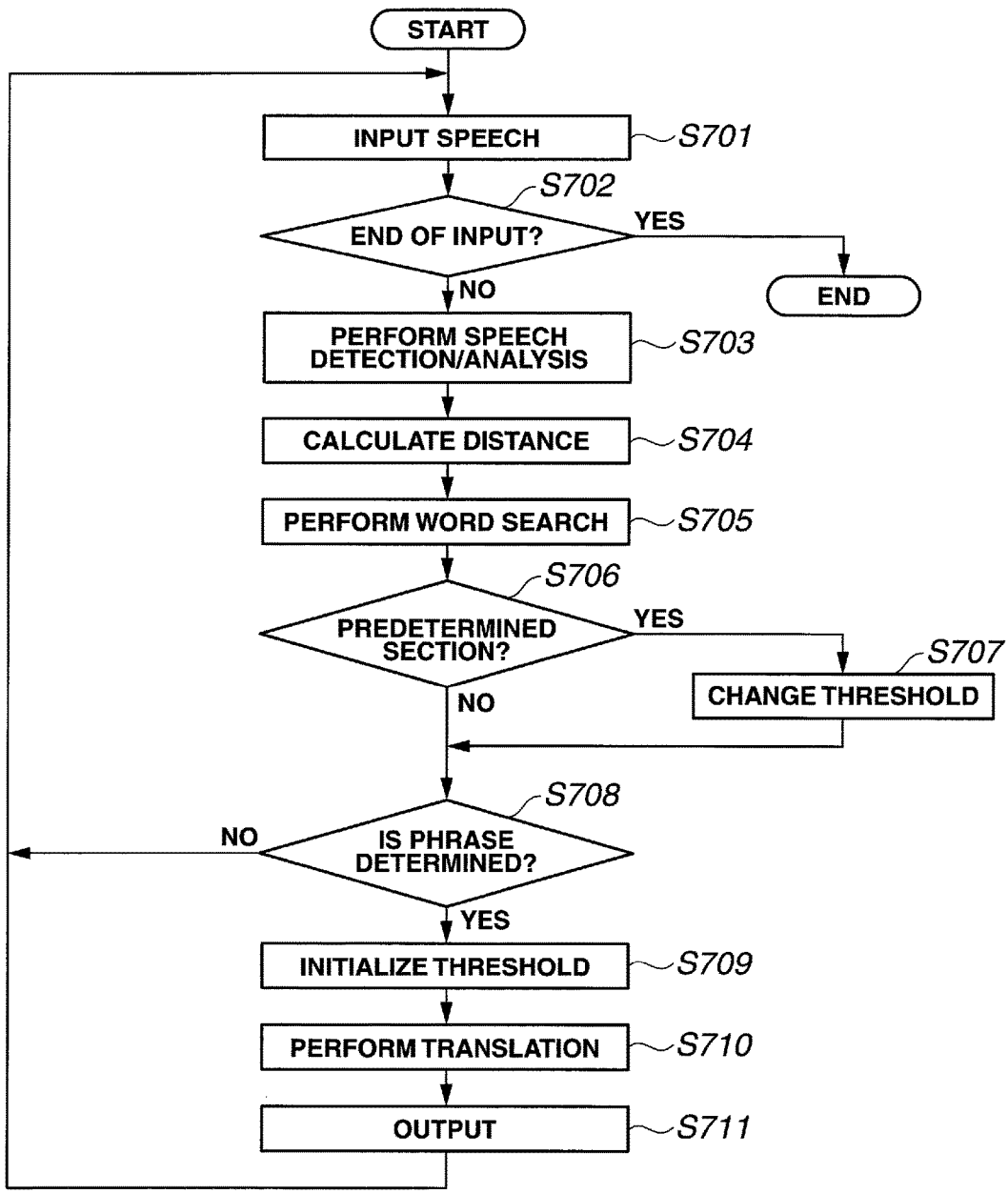
FIG. 7 is a flowchart for explaining an example of the operation of the speech processing device according to the fourth exemplary embodiment of the present invention.

An example of the operation of the speech processing device 600 will be described next with reference to the flowchart shown in FIG. 7. First of all, in step S701, the input unit 601 inputs speech. For example, the input unit 601 is a microphone. For example, an English speech waveform input from the microphone is obtained. In step S702, the device determines the end of the speech input. If, for example, there is input speech, the device continues the subsequent processing. If the input operation has come to an end, the device terminates the processing.

In step S703, the analysis unit 602 detects a speech section from the input speech, performs acoustic analysis of the detected section, and outputs a feature amount sequence. In step S704, the distance calculation unit 631 of the speech recognition unit 603 calculates the distance between the feature amount sequence obtained by the analysis unit 602 and the acoustic model stored in the acoustic model storage unit 604. In this case, the distance calculation unit 631 calculates the closeness between the input speech and the acoustic model. For example, the distance calculation unit 631 calculates the acoustic distance between the feature amount sequence obtained by the analysis unit 602 and the acoustic model, and outputs the distance calculation result. Since a technique of calculating the distance from the acoustic model is a well known technique, a detailed description of it will be omitted.

In step S705, the word search unit 632 of the speech recognition unit 603 generates a hypothetical word (word hypothesis) by searching for the most likelihood word string by using the recognition dictionary stored in the recognition dictionary storage unit 605 based on the distance calculation result obtained by the distance calculation unit 631. If, for example, the input speech is English speech, the device performs English speech recognition to generate a word hypothesis formed from a likelihood English word or word string. A word search technique in speech recognition is a well known technique, and hence a detailed description of it will be omitted.

In step S706, the section designation unit 634 in the word search unit 632 determines whether a set time interval (e.g., 500 ms) has elapsed. When executing step S706 for the first time since the start of speech input (speech processing), the section designation unit 634 determines whether 500 ms has elapsed since the start of speech processing. If the 634 determines in step S706 that the set time interval has not elapsed, the process shifts to step S708. If the section designation unit 634 determines in step S706 that the set time has elapsed, the section designation unit 634 reduces the threshold used by the phrase determination unit 633 by a set value.

In step S708, the phrase determination unit 633 determines a phrase boundary based on the comparison between the obtained word hypothesis and set words representing phrase boundaries. The phrase determination unit 633 determines a phrase boundary in the same manner as the phrase determination unit 233 in the second exemplary embodiment described above. If the hypothesis occupation ratio is equal to or less than the threshold in this determination ("N" in step S708), the process returns to step S701 to accept the next speech input.

If the hypothesis occupation ratio exceeds the threshold in the above determination, a phrase boundary is set in the same manner as in the second exemplary embodiment, and the process shifts to step S709. In step S709, the threshold used by the phrase determination unit 633 is initialized. Therefore, if the hypothesis occupation ratio continues to be equal to or less than the threshold, the threshold is reduced every time it is determined in step S706 that the set time interval has elapsed. This makes it easy to determine a phrase boundary.

Subsequently, in step S710, the translation unit 607 translates a recognition result word string up to the determined phrase boundary by using the translation dictionary stored in the translation dictionary storage unit 606, and outputs the translation result. If, for example, the input language is English and the output language is Japanese, an English word string obtained as a recognition result word string is translated from English to Japanese, and a Japanese word string is output as a translation result. In step S711, an output unit 608 outputs the above translation result in a state which allows the user to visually recognize the result. When the translation result is output, the process returns to step S701. Steps S701 to S711 are continued until the speech input stops.

As described above, the speech processing device 600 in this exemplary embodiment performs speech translation while determining phrase boundaries of continuously input speech. That is, this device outputs a recognition result word string and perform translation processing for each unit suitable for translation, and hence can sequentially output speech translation results. In addition, if phrase boundary determination cannot be done even after the lapse of a predetermined time, the threshold for phrase determination is changed. Even if, therefore, for example, phrase boundary determination is difficult to perform, this change facilitates phrase boundary determination. This makes it possible to perform translation processing more sequentially.

In this exemplary embodiment as well, since the device performs phrase boundary determination in the process of word search in speech recognition processing instead of performing it after recognition processing, there is little chance that the sequential/real-time performance of recognition result outputs will deteriorate. In addition, giving consideration to the likelihoods and occupation ratios of hypotheses in the process of word search allows to suppress a deterioration in speech recognition accuracy due to sequential recognition result output operation.

According to the above description, the threshold for phrase determination is changed at predetermined time intervals until a phrase boundary is determined. However, the present invention is not limited to this. For example, it is possible to change the threshold for phrase determination in two steps (two times) within a predetermined time.

Fifth Exemplary Embodiment

Figure 8:
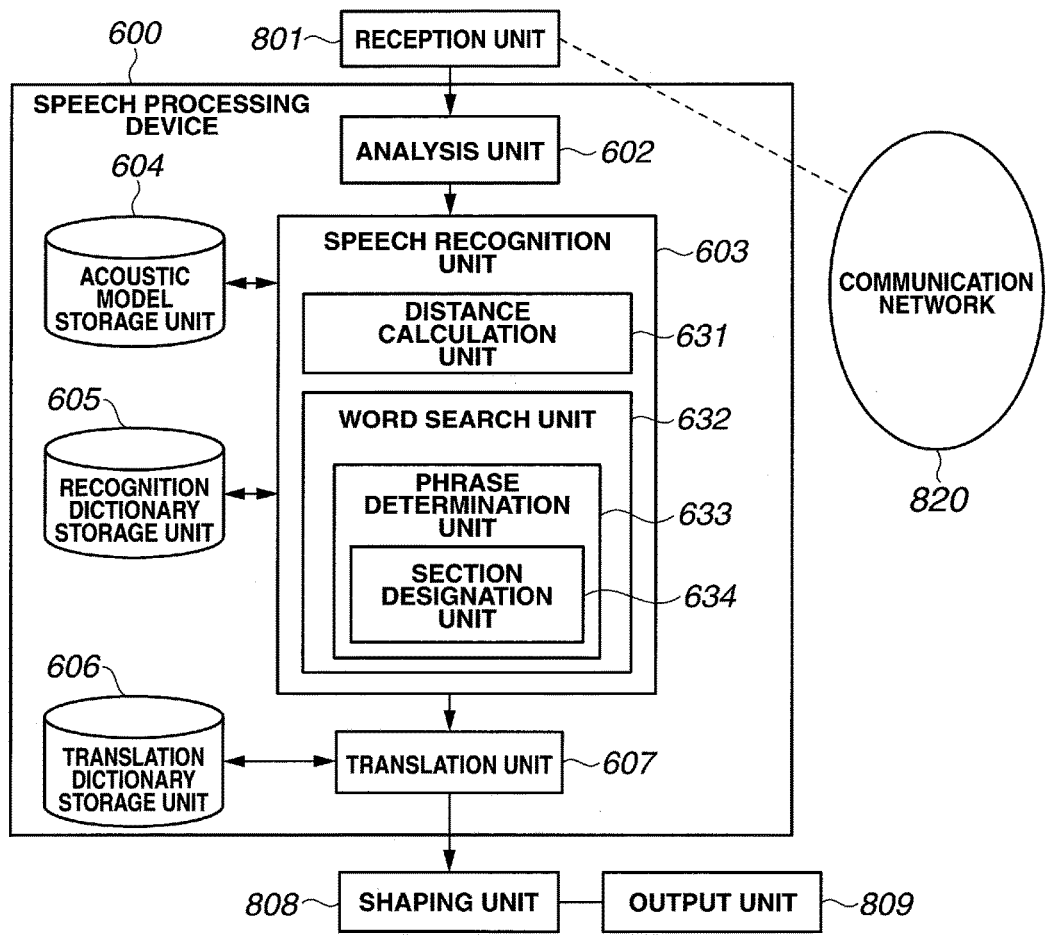
FIG. 8 is a block diagram showing the arrangement of a caption generation system according to the fifth exemplary embodiment of the present invention using the speech processing device of the fourth exemplary embodiment.

The fifth exemplary embodiment of the present invention will be described next. FIG. 8 is a block diagram showing the arrangement of a caption generation system according to the fifth exemplary embodiment using a speech processing device 600. This system includes a reception unit 801, a shaping unit 808, an output unit 809, and a communication network 820, in addition to the speech processing device 600 in the fourth exemplary embodiment described above.

The reception unit 801 receives the speech input from the communication network 820, and outputs the speech to the speech processing device 600. In the speech processing device 600, an analysis unit 602 receives the speech received by the reception unit 801 as an input, and performs speech detection/analysis of the speech. A translation unit 607 sequentially outputs translation results to the shaping unit 808. If, for example, the input language is English and the output language is Japanese, the input speech is translated from English to Japanese, and a Japanese word string is output as a translation result.

The shaping unit 808 shapes sequentially obtained translation results (text data), and outputs the shaped text data. More specifically, if, for example, a Japanese word string is obtained as a translation result, the shaping unit 808 inserts a summary or line feeds. A technique of inserting a summary or line feeds in text data is a well known technique, and hence a detailed description of it will be omitted. The output unit 809 is, for example, a display. The output unit 809 receives the speech data obtained by the shaping unit 808 and outputs speech.

Figure 9:
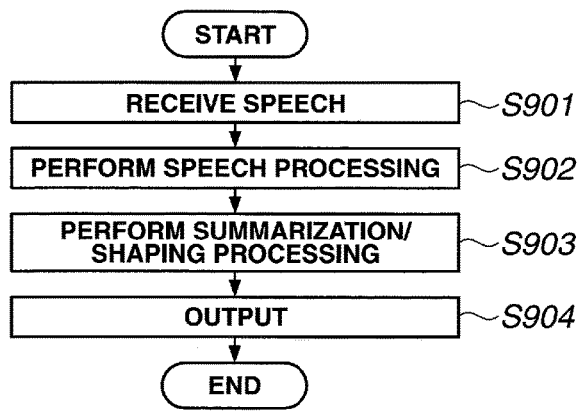
FIG. 9 is a flowchart for explaining an example of the operation of the system according to the fifth exemplary embodiment of the present invention.

The operation of the system in the fifth exemplary embodiment will be described next with reference to the flowchart of FIG. 9. First of all, in step S901, the reception unit 801 receives the speech waveforms continuously input from the communication network 820. In step S902, the analysis unit 602, a speech recognition unit 203, and the translation unit 607 in the speech processing device 600 perform the speech processing described in the fourth exemplary embodiment, thereby sequentially outputting translation results.

In step S903, the shaping unit 808 shapes the translation result obtained by a speech processing device 600 (S202). For example, the shaping unit 808 inserts a summary or line feeds in a Japanese word string (text data) output as a translation result to shape the word string into a form that allows to easily see the text when it is displayed, thus outputting text data as a shaping result. In step S904, the output unit 809 displays the shaped text on, for example, a display.

As described above, the fifth exemplary embodiment sequentially performs speech processing of the speech data continuously received/input from the communication network 820. This makes it possible to sequentially output translation results (shaped text data). For example, as in the generation of captions in TV broadcasting, when input operation is continuously performed regardless of the user's intention, the suspension or delay of processing poses a serious problem. In such a case, performing output operation at predetermined intervals can produce good effects.

The above system is a general-purpose computer system and includes a CPU, a RAM, a ROM, and a nonvolatile storage device as components (not shown). The CPU reads the OS and speech communication translation program stored in the RAM, ROM, or nonvolatile storage device, and executes speech communication translation processing by executing them. This makes it possible to translate speech during speech communication and sequentially output the translation results. Note that the above system need not be constituted by one computer and may be constituted by a plurality of computers.

Note that the above description is based on the assumption that speech processing is sequentially performed. However, the subsequent processing to be combined with speech recognition is not limited to translation. For example, the present invention can be applied in the same manner to any processing that requires language processing such as speech search and speech summarization. Recently, the market of products using speech recognition/translation techniques has grown. The present invention can be applied to such situations.

Some or all of the above exemplary embodiments are also described in the following appendixes. However, the present invention is not limited to the following appendices.

APPENDIX 1

A speech processing device is characterized by comprising analysis means for outputting a feature amount by performing speech detection/analysis of input speech, and speech recognition means for outputting a recognition result by performing speech recognition based on the feature amount, wherein the speech recognition means comprises phrase determination means for determining a phrase boundary based on comparison between a hypothetical word group generated by the speech recognition and a set word representing phrase boundary, and outputs the recognition result for each phrase based on a phrase boundary determined by the phrase determination means.

APPENDIX 2

A speech processing device according to appendix 1 is characterized in that the phrase determination means sets the phrase boundary based on a likelihood of a word representing the phrase boundary in the hypothetical word group.

APPENDIX 3

A speech processing device according to appendix 2 is characterized in that the phrase determination means determines the phrase boundary when an occupation ratio of a word representing the phrase boundary in the hypothetical word group exceeds a set threshold.

APPENDIX 4

A speech processing device according to appendix 2 is characterized in that the phrase determination means determines the phrase boundary when the word hypothesis representing the phrase boundary exhibits a maximum likelihood among overall word hypotheses and a likelihood difference from a word hypothesis exhibiting a second highest likelihood exceeds a set threshold.

APPENDIX 5

A speech processing device according to any one of appendices 1 to 4 is characterized in that the phrase determination means further comprises section designation means for designating section information of input speech, and the phrase determination means temporarily changes the threshold within a set section for each section set by the section designation means.

APPENDIX 6

A speech processing device according to any one of appendices 1 to 5 is characterized in that the word representing the phrase boundary comprises a word representing a phrase boundary appearing at a head or tail of a phrase.

APPENDIX 7

A speech processing device according to appendix 6 is characterized in that the word representing the phrase boundary comprises a preposition or a conjunction, and a position immediately before the word is a phrase boundary.

APPENDIX 8

A speech processing method is characterized by comprising the analysis step of outputting a feature amount by performing speech detection/analysis of input speech, and the speech recognition step of outputting a recognition result by performing speech recognition based on the feature amount, wherein the speech recognition step comprises the phrase determination step of determining a phrase boundary based on comparison between a hypothetical word group generated by the speech recognition and a set word representing phrase boundary, the recognition result being output for each phrase based on a phrase boundary determined in the phrase determining step.

APPENDIX 9

A computer-readable storage medium is characterized by storing a program for causing a computer to implement an analysis function of outputting a feature amount by performing speech detection/analysis of input speech, and a speech recognition function of outputting a recognition result by performing speech recognition based on the feature amount, wherein the speech recognition function comprises a phrase determination function of determining a phrase boundary based on comparison between a hypothetical word group generated by the speech recognition and a set word representing phrase boundary, and the speech recognition function outputs the recognition result for each phrase based on a phrase boundary determined by the phrase determination function.

The present invention has been described above with reference to the exemplary embodiments. However, the present invention is not limited to the above exemplary embodiments. Various changes that can be understood by those skilled in the art within the scope of the invention may be made to the arrangements and details of the present invention.

This application claims the priority based on Japanese Patent Application No. 2009-168764 filed on Jul. 17, 2009, the entire contents of which are hereby incorporated by reference.

INDUSTRIAL APPLICABILITY

The present invention can be applied to speech input/translation services using speech recognition/machine translation techniques.

EXPLANATION OF THE REFERENCE NUMERALS AND SIGNS

101 . . . analysis unit, 102 . . . speech recognition unit, 103 . . . phrase determination unit

The invention claimed is:
1. A speech processing device comprising:
an analysis unit that is configured to output a feature amount by performing speech detection/analysis of input speech; and
a speech recognition unit that is configured to output a recognition result by performing speech recognition based on the feature amount,
wherein:
said speech recognition unit comprises a phrase determination unit that is configured to determine a phrase boundary based on comparison between a hypothetical word group generated by the speech recognition and a word representing phrase boundary set in advance,
said speech recognition unit is configured to output the recognition result for each phrase up to the phrase boundary determined by said phrase determination unit,
said phrase determination unit is configured to stand by until an occupation ratio of a number of the words representing the phrase boundaries in the hypothetical word group generated by the speech recognition unit to a number of all the words of the hypothetical word group exceeds a set threshold, and said phrase determination unit is configured to determine the phrase boundary based on a likelihood of the word representing the phrase boundary in the hypothetical word group when the occupation ratio exceeds the set threshold.

2. A speech processing device according to claim 1, wherein said phrase determination unit is configured to determine the phrase boundary when the word hypothesis representing the phrase boundary exhibits a maximum likelihood among overall word hypotheses and a likelihood difference from a word hypothesis exhibiting a second highest likelihood exceeds a set threshold.

3. A speech processing device according to claim 1, wherein said phrase determination unit further comprises a section designation unit that is configured to designate section information of input speech, and said phrase determination unit is configured to temporarily change the threshold within a set section for each section set by said section designation unit.

4. A speech processing device according to claim 1, wherein the word representing the phrase boundary comprises a word representing a phrase boundary appearing at a head or tail of a phrase.

5. A speech processing device according to claim 4, wherein the word representing the phrase boundary comprises a preposition or a conjunction, and a position immediately before the word is a phrase boundary.

6. A speech processing method comprising:
an analysis step of outputting a feature amount by performing speech detection/analysis of input speech; and
a speech recognition step, executed by a speech processor, of outputting a recognition result by performing speech recognition based on the feature amount,
wherein the speech recognition step comprises the phrase determination step of determining a phrase boundary based on comparison between a hypothetical word group generated by the speech recognition and a word representing phrase boundary set in advance, the recognition result being output for each phrase up to the phrase boundary determined in the phrase determination step,
wherein said phrase determination step comprises standing by until an occupation ratio of a number of the words representing the phrase boundaries in the hypothetical word group generated in the speech recognition step to a number of all the words of the hypothetical word group exceeds a set threshold, and
in the phrase determination step, the phrase boundary is determined based on a likelihood of the word representing the phrase boundary in the hypothetical word group when the occupation ratio exceeds the set threshold.

7. A non-transitory computer-readable storage medium storing a program for causing a computer to execute:
an analysis step of outputting a feature amount by performing speech detection/analysis of input speech; and
a speech recognition step of outputting a recognition result by performing speech recognition based on the feature amount,
wherein the speech recognition step comprises the phrase determination step of determining a phrase boundary based on comparison between a hypothetical word group generated by the speech recognition and a word representing phrase boundary set in advance,
wherein said phrase determination step comprises standing by until an occupation ratio of a number of the words representing the phrase boundaries in the hypothetical word group generated in the speech recognition step to a number of all the words of the hypothetical word group exceeds a set threshold, and
wherein the speech recognition step outputs the recognition result for each phrase up to the phrase boundary determined by the phrase determination step, and in the phrase determination step, the phrase boundary is determined based on a likelihood of the word representing the phrase boundary in the hypothetical word group when the occupation ratio exceeds the set threshold.

8. A speech processing device comprising:
analysis means for outputting a feature amount by performing speech detection/analysis of input speech; and
speech recognition means for outputting a recognition result by performing speech recognition based on the feature amount,
wherein:
said speech recognition means comprises phrase determination means for determining a phrase boundary based on comparison between a hypothetical word group generated by the speech recognition and a word representing phrase boundary set in advance,
said speech recognition means outputs the recognition result for each phrase up to the phrase boundary determined by said phrase determination means,
said phrase determination means stands by until an occupation ratio of a number of the words representing the phrase boundaries in the hypothetical word group generated by the speech recognition means to all words of the hypothetical word group exceeds a set threshold, and
said phrase determination means determines the phrase boundary based on a likelihood of the word representing the phrase boundary in the hypothetical word group when the occupation ratio exceeds the set threshold.

* * * * *